(12) United States Patent
Jacobsen et al.

(10) Patent No.: US 6,205,220 B1
(45) Date of Patent: Mar. 20, 2001

(54) METHOD TO MITIGATE THE NEAR-FAR FEXT PROBLEM

(75) Inventors: Krista S. Jacobsen, Mountain View; Brian Wiese, San Carlos, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/134,592

(22) Filed: Aug. 13, 1998

Related U.S. Application Data

(60) Provisional application No. 60/091,083, filed on Jun. 29, 1998.

(51) Int. Cl.[7] .................................................. H04B 1/38
(52) U.S. Cl. ............................ 379/417; 379/410; 379/406
(58) Field of Search ................................... 379/410, 406, 379/417; 381/98; 370/289

(56) References Cited

U.S. PATENT DOCUMENTS

| | | | |
|---|---|---|---|
| 4,715,064 | * 12/1987 | Claessen | 379/392 |
| 5,483,551 | * 1/1996 | Huang et al. | 375/219 |
| 5,710,758 | * 1/1998 | Soliman et al. | 370/241 |
| 5,793,801 | * 8/1998 | Fertner | 375/219 |
| 5,809,033 | * 9/1998 | Turner et al. | 370/522 |
| 5,887,032 | * 3/1999 | Cioffi | 375/257 |
| 5,991,311 | * 11/1999 | Long et al. | 370/524 |
| 5,999,542 | * 12/1999 | Turner et al. | 370/497 |
| 6,002,776 | * 12/1999 | Bhadkamkar et al. | 381/66 |

OTHER PUBLICATIONS

Dr. Boaz Porat, "A Proposal for Power Back–Off Algorithm in VDSL Systems based on FDD", Jun. 22–26, 1998, *ETSI TM6*, Lulea, Schweden.

Sartenaer et al., "Upstream Power Cut–Back needed for solidarity between VDSL modems distributed along a cable", Jan. 26–30, 1998, *ETSI TM6*, Madrid.

Clarke et al., "Power–Backoff methods for VDSL", Jun 22–26, 1998, *ETSI STC TM6*, Luleå, Sweden.

Christopher J. Hansen, "Probing Techniques for Multiuser Channels with Power Control", 1997, University of Los Angeles.

* cited by examiner

*Primary Examiner*—David R. Hudspeth
*Assistant Examiner*—Susan Wieland
(74) *Attorney, Agent, or Firm*—J. Dennis Moore; Wade James Brady, III; Frederick J. Telecky, Jr.

(57) ABSTRACT

The present invention provides methods and apparatuses for reducing near-far cross-talk interference between channels in a communication system. Channels of different lengths that are disposed adjacent to each other and carrying signals at the same frequencies often time create cross-talk interference in their neighboring channels. By spectrally shaping the signals carried on shorter lines the amount of cross-talk interference generated by these lines to longer lines may be significantly reduced, resulting in a better overall performance. In one embodiment of the present invention, a method of reducing the generation of near-far cross-talk interference includes spectrally shaping a signal carried on a first channel to reduce the amount of cross-talk coupling a neighboring second channel. In further embodiments, the shaping of the signal carried on the first channel is based in part on characteristics of the second and/or first channel. The characteristics include, but are not limited to, the length of the channels and the transfer functions of the channels. The present invention, in alternative embodiments, may also be embodied in a communication system, a central unit and a transceiver (or remote unit) or other suitable types of communication devices that are capable of shaping transmissions to reduce cross-talk interference generated by the transmissions.

41 Claims, 8 Drawing Sheets

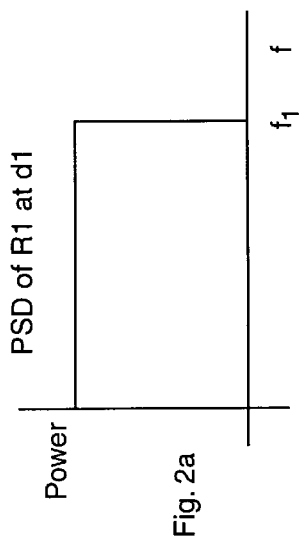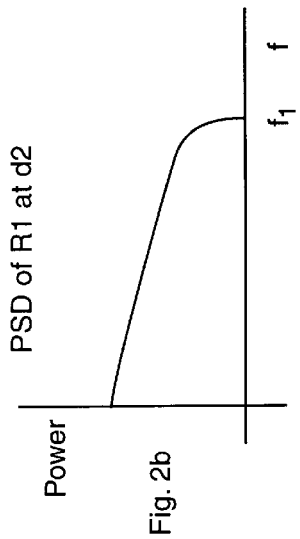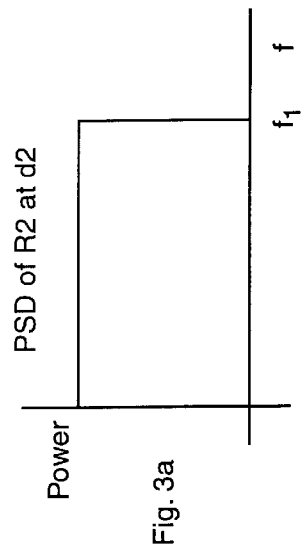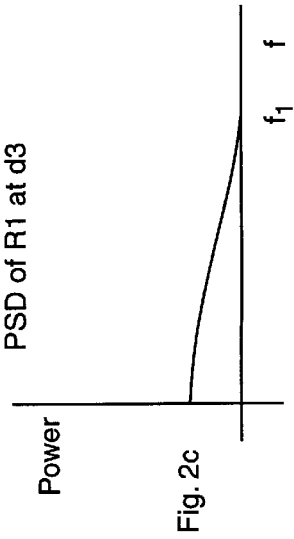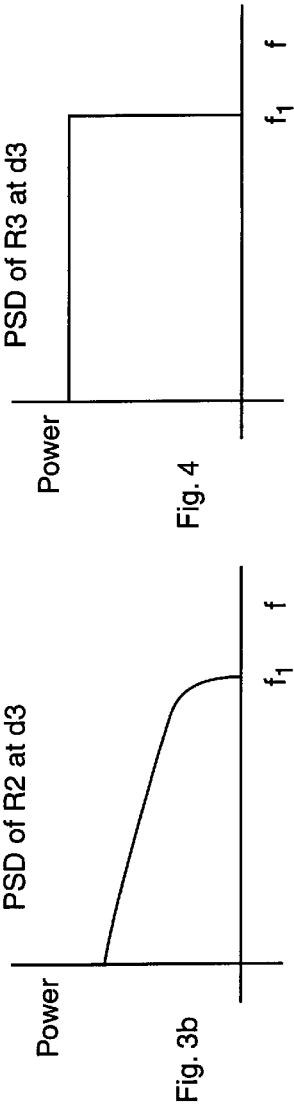

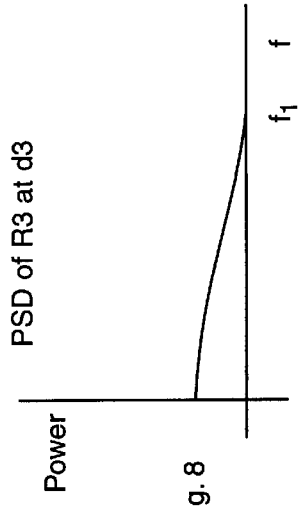
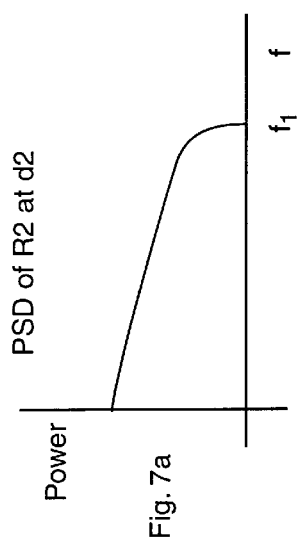
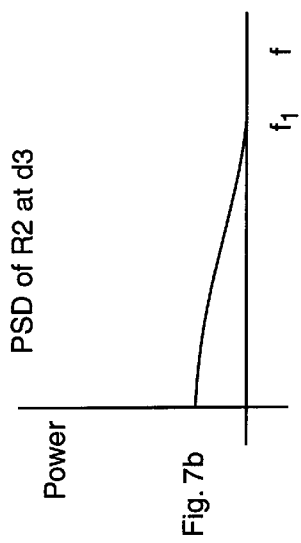
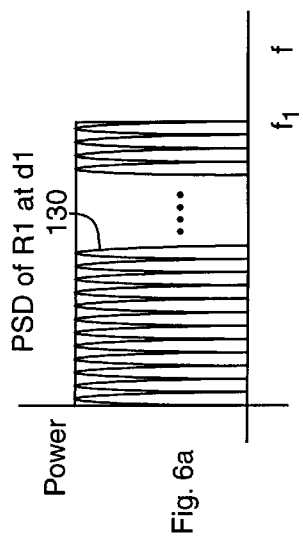
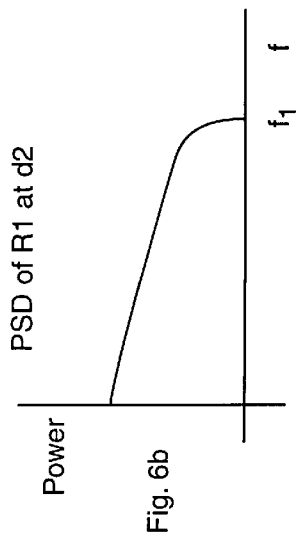
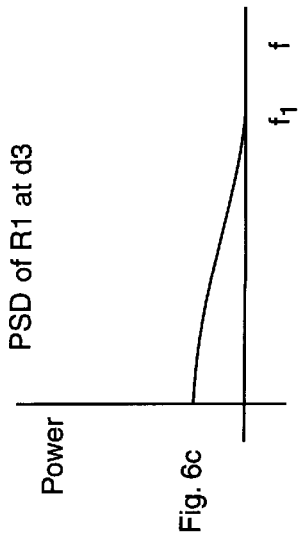

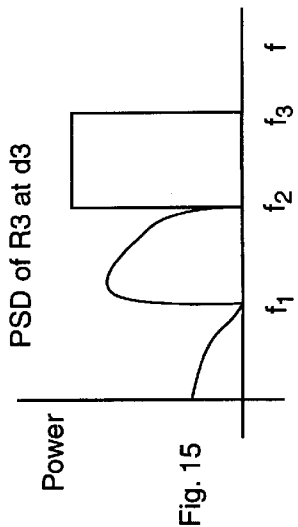
Fig. 15
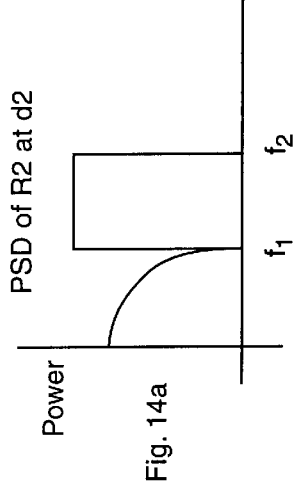
Fig. 14a
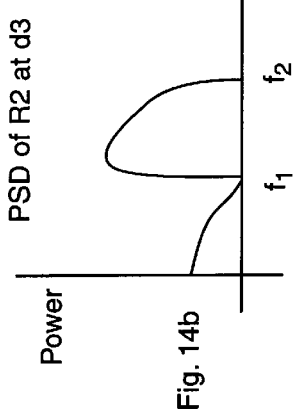
Fig. 14b
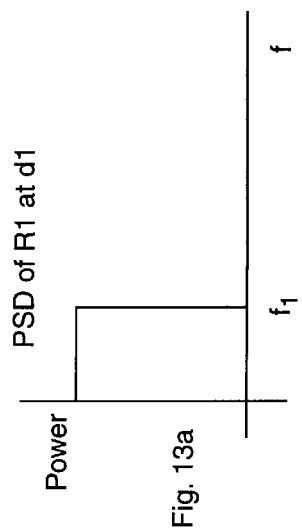
Fig. 13a
Fig. 13b
Fig. 13c

METHOD TO MITIGATE THE NEAR-FAR FEXT PROBLEM

CROSS-REFERENCE TO RELATED APPLICATION

This application claims the priority of U.S. Provisional patent application Ser. No. 60/091,083, filed Jun. 29 1998 and entitled "A METHOD TO MITIGATE THE NEAR-FAR FEXT PROBLEM" by Krista S. Jacobsen and Brian Wiese, which is incorporated herein by reference in its entirety.

BACKGROUND OF THE INVENTION

The present invention relates generally to communication systems. More particularly, the present invention relates to high-speed communication systems that are particularly well suited for employing multi-carrier modulation schemes.

With the increasing popularity of the Internet, video conferencing and other communication systems that require the transmission of relatively large quantities of data to households and businesses, there have been corresponding demands for higher speed modems for use in bi-directional communications. Given the inherent limitations of single carrier modulation schemes, there has been an increasing interest in the use of multi-carrier modulation schemes.

Some of the more popular systems contemplate the use of digital subscriber lines (e.g. telephone lines), cable lines, and various radio interfaces. In many of the proposed applications, point to point and point to multi-point transmission schemes are contemplated. By way of example, at the time of this writing, the Alliance For Telecommunications Industry Solutions (ATIS), which is a group accredited by the ANSI (American National Standard Institute) Standard Group is working on the next generation subscriber line based transmission system, which is referred to as the VDSL (Very High-Speed Digital Subscriber Line) standard. The VDSL standard is intended to facilitate transmission rates of up to 51.92 Mbit/s.

Simultaneously, the Digital, Audio and Video Council (DAVIC) is working on a short range system, which is referred to as Fiber To The Curb (FTTC). A number of multi-carrier modulation schemes have been proposed for use in the VDSL and FTTC standards (hereinafter VDSL/FTTC). One proposed multi-carrier solution utilizes discrete multi-tone (DMT) signals in a system that is similar in nature to the ADSL standard that was recently adopted by ANSI for a slightly lower speed system. Other proposed modulation schemes include carrierless amplitude and phase modulated (CAP) signals; discrete wavelet multi-tone modulation (DWMT); and orthogonal frequency division multiplexing (OFDM) which is a simplified version of DMT.

A typical subscriber line based telecommunications local loop is illustrated in FIG. 1. As seen therein, a central unit 10 at a central location communicates with a number of remote units $R_1$–$R_3$ 22–24 over discrete transmission lines 14, 16 and 18. A variety of transmission media can be used as the transmission line. By way of example, coaxial cables, twisted pair phone lines, and hybrids that incorporate two or more different media all work well. This approach also works well in wireless systems.

The remote units 22–24 may be end user units that may exist in a home, office or the like. Typically, a number of remote units 22–24 are serviced by a particular central office. In currently installed systems, the remote units are often telephones, however, they may be fax lines, computer terminals, televisions, set top boxes or a wide variety of other devices capable of connecting to the "phone lines". The central unit 10 may include a transceiver for each line that functions as a transmitter and a receiver.

In some embodiments, the central unit is a master server located at a central office that originates the communications. In other embodiments, the "central unit" may be a lower level distribution component in the system architecture that receives and retransmits signals. The central unit receives information through a higher bandwidth trunk line and retransmits the information to the remote units. In one embodiment, the trunk line takes the form of a fiber optic cable and the central unit takes the form of an optical network unit (ONU).

The central unit 10 communicates with remote units $R_1$–$R_3$ over discrete lines 14, 16 and 18. Typically, a number of remote units are serviced by a particular central unit or ONU. By way of example, in North America, typical ONUs may service on the order of 4 to 96 remote units. The ONU receives downstream source signals over one or more trunk lines and transmits the information embodied therein to the appropriate remote units as downstream communication signals. Similarly, the ONU receives upstream communication signals from the remote units and transmits the information embodied therein as upstream source signals. The source signals may be passed to a central office, another distribution unit or any other suitable location. A service provider would typically be arranged to provide the data to the central modem for transmission to the remote units and to handle the data received by the central modem from the remote units. The service provider can take any suitable form. By way of example, the service provider can take the form of a network server. The network server can take the form of a dedicated computer or a distributed system.

The distance between the central unit 10 and the furthest remote unit may vary a fair amount. By way of example, it is expected that in the VDSL/FTTC standards, twisted pair loop lengths of up to 1000 feet (300 meters) will be permitted for downstream communications at 51.92 MHz. Similarly, loop lengths of up to 3000 feet (900 meters) may be permitted for downstream communications at 25.96 MHz and loop lengths of up to 5000 feet (1500 meters) may be permitted for downstream communications at 12.97 MHz. As will be appreciated by those skilled in the art, shorter maximum loop lengths generally correspond to higher achievable data rates.

A problem associated with having remote units at different distances from the central unit is the occurrence of non-uniform far-end crosstalk, often referred to as "near-far FEXT" or "unequal-level FEXT". Most models used to design and optimize point to multi-point communication systems assume that the amount of cross-talk between lines (e.g., 14, 16 and 18) is the same between all the lines. That is, the models assume that all the lines are of equal length.

Referring back to FIG. 1, the drop points of the remote units 22–24 are located at distances $d_1$, $d_2$ and $d_3$. In a typical communication system all the remote units transmit at the maximum possible power because all the remote units believe they are equally distant from the central unit 10.

FIGS. 2a–2c, 3a–3b and 4 illustrate the power spectral densities (PSDs) of the transmissions of the remote units at distances $d_1$, $d_2$ and $d_3$. Referring to FIG. 2a, the output of remote unit $R_1$ is the maximum power output over the entire usable frequency range, $0<f<f_i$, at distance $d_1$, the drop point of the remote unit. In FIG. 2b, the signal attenuates over distance at $d_2$ according to the transfer function H(f) of line 14. The signal further attenuates at distance $d_3$, as shown in FIG. 2c. The attenuation of the signal from remote unit $R_1$ to central unit 10 is a normal function of the transmission medium.

FIGS. 3a and 3b depict the PSD of a signal transmitted from remote unit $R_2$ to central unit 10 at distance $d_2$ and $d_3$, respectively. At point $d_2$ the output of remote unit $R_2$ is the maximum over all the usable frequency range, as shown in FIG. 3a. FIG. 3b illustrates the attenuation of the signal at point $d_3$. Notice that the PSD of the signal on line 14 at point $d_2$ is significantly less than the PSD of the signal of line 16 at point d2. Again, most models and designs assume that the signal strengths of two signals at any given point is the same, thus causing the same amount of cross-talk. In reality, the signal carried on line 16 will cause more cross-talk interference on line 14 than the signal on line 14 causes on line 16.

The problem is exacerbated with more remote units at varying distances. FIG. 4 illustrates the PSD of a signal transmitted from remote unit $R_3$ on line 18 to central unit 10 at distance $d_3$. The PSDs of the signals carried on lines 14, 16 and 18 are significantly different. The difference in the signal strengths leads to more cross-talk interference generated by the shorter lines. In the illustrated embodiment, the signal carried on line 18 would tend to cause cross-talk interference in both lines 14 and 16.

In typical systems no account is made for the different signal strengths of signals carried on different length lines. Most systems assume that all the remote units are equidistant from the central unit, and therefore the amount of cross-talk caused by other lines n a particular are the same as the cross-talk generated by that particular line. As illustrated, in most cases this assumption is incorrect. Thus, when near-far FEXT occurs the throughput of the lines are degraded and the communication system becomes less efficient than expected. Therefore, a need exists for improved methods of minimizing the effects of near-far FEXT.

SUMMARY OF THE INVENTION

The present invention provides methods and apparatuses for reducing cross-talk interference between channels in a communication system. Channels that are disposed adjacent to each other and carrying signals at the same frequencies often time create cross-talk interference in their neighboring channels. By shaping the signals carried on the lines the amount of cross-talk interference generated by the signals carried on the channels may be significantly reduced.

In one embodiment of the present invention, a method of reducing the generation of cross-talk interference includes shaping a signal carried on a first channel to reduce the amount of cross-talk generated by the signal and carried over into a neighboring second channel. In a further embodiment, the spectral shapes of all the signals on all lines, as received at a central unit, are approximately the same.

In further embodiments, the shaping of the signal carried on the first channel is based in part on characteristics of the second and/or first channel. The characteristics include, but are not limited to, the length of the channels and the transfer functions of the channels.

In another embodiment, the shaping of the signal is performed over the entire frequency spectrum of the signal. Alternatively, the shaping of the signal may be performed over a subrange of the entire frequency spectrum. In a particular embodiment, the signal is a multi-carrier signal including a plurality of carriers centered at a corresponding plurality of frequencies. The shaping of the signal is performed over a subrange of the entire frequency, thus shaping only a subset of the plurality of carriers.

The present invention, in alternative embodiments, may also be embodied in a communication system, a central unit and a transceiver (or remote unit) or other suitable types of communication devices that are capable of shaping transmissions to reduce cross-talk interference generated by the transmissions.

A further understanding of the nature and advantages of the present invention may be a realized by reference to the remaining portions of the specification and the drawings.

BRIEF DESCRIPTION OF THE DRAWINGS

FIG. 2a illustrates the power spectral density of the transmission of remote unit $R_1$ of FIG. 1 measured at distance $d_1$.

FIG. 2b illustrates the power spectral density of the transmission of remote unit $R_1$ of FIG. 1 measured at distance $d_2$.

FIG. 2c illustrates the power spectral density of the transmission of remote unit $R_1$ of FIG. 1 measured at distance $d_3$.

FIG. 3a illustrates the power spectral density of the transmission of remote unit $R_2$ of FIG. 1 measured at distance $d_2$.

FIG. 3b illustrates the power spectral density of the transmission of remote unit $R_2$ of FIG. 1 measured at distance $d_3$.

FIG. 4 illustrates the power spectral density of the transmission of remote unit $R_3$ of FIG. 1 measured at distance $d_3$.

FIG. 6a illustrates the PSD of a signal transmitted by remote unit $R_1$ of FIG. 5 measured at distance $d_1$ in accordance with an embodiment of the present invention.

FIG. 6b illustrates the PSD of a signal transmitted by remote unit $R_1$ of FIG. 5 measured at distance $d_2$ in accordance with an embodiment of the present invention.

FIG. 6c illustrates the PSD of a signal transmitted by remote unit $R_1$ of FIG. 5 measured at distance $d_3$ in accordance with an embodiment of the present invention.

FIG. 7a illustrates the PSD of a shaped signal transmitted by remote unit $R_2$ of FIG. 5 measured at distance $d_2$ in accordance with an embodiment of the present invention.

FIG. 7b illustrates the PSD of a shaped signal transmitted by remote unit $R_2$ of FIG. 5 measured at distance $d_3$ in accordance with an embodiment of the present invention.

FIG. 8 illustrates the PSD of a shaped signal transmitted by remote unit $R_3$ of FIG. 5 measured at distance $d_3$ in accordance with an embodiment of the present invention.

FIG. 13a illustrates the PSD of a signal transmitted by remote unit $R_1$ of FIG. 5 measured at distance $d_1$ in accordance with an embodiment of the present invention.

FIG. 13b illustrates the PSD of a signal transmitted by remote unit $R_1$ of FIG. 5 measured at distance $d_2$ in accordance with an embodiment of the present invention.

FIG. 13c illustrates the PSD of a signal transmitted by remote unit $R_1$ of FIG. 5 measured at distance $d_3$ in accordance with an embodiment of the present invention.

FIG. 14a illustrates the PSD of a shaped signal transmitted by remote unit $R_2$ of FIG. 5 measured at distance $d_2$ in accordance with an embodiment of the present invention.

FIG. 14b illustrates the PSD of a shaped signal transmitted by remote unit $R_2$ of FIG. 5 measured at distance $d_3$ in accordance with an embodiment of the present invention.

FIG. 15 illustrates the PSD of a shaped signal transmitted by remote unit $R_3$ of FIG. 5 measured at distance $d_3$ in accordance with an embodiment of the present invention.

DETAILED DESCRIPTION OF THE PRESENT INVENTION

The present invention provides methods and apparatuses for reducing the effects of near-far FEXT in point to multi-point communication systems. Reducing near-far FEXT in such communication systems aids in achieving the greatest data rate within an allotted amount of bandwidth.

The effects of near-far FEXT may be minimized to a significant extent by shaping the PSD of the signals transmitted by the remote units based upon the relative distances of the remote units. Generally, the transmissions of remote units that are located closer to a central unit are shaped to mimic the PSD of a signal transmitted from the furthest remote unit. By shaping the PSD of the transmissions of the closer units the signals carried on the disparate lines have similar PSDs and, therefore, generate approximately the same amount of cross-talk interference. Thus, assumptions made in the design of point to point and point to multi-point communications systems are validated, which provides the communication systems the ability to achieve the desired data rates.

Figure 1:
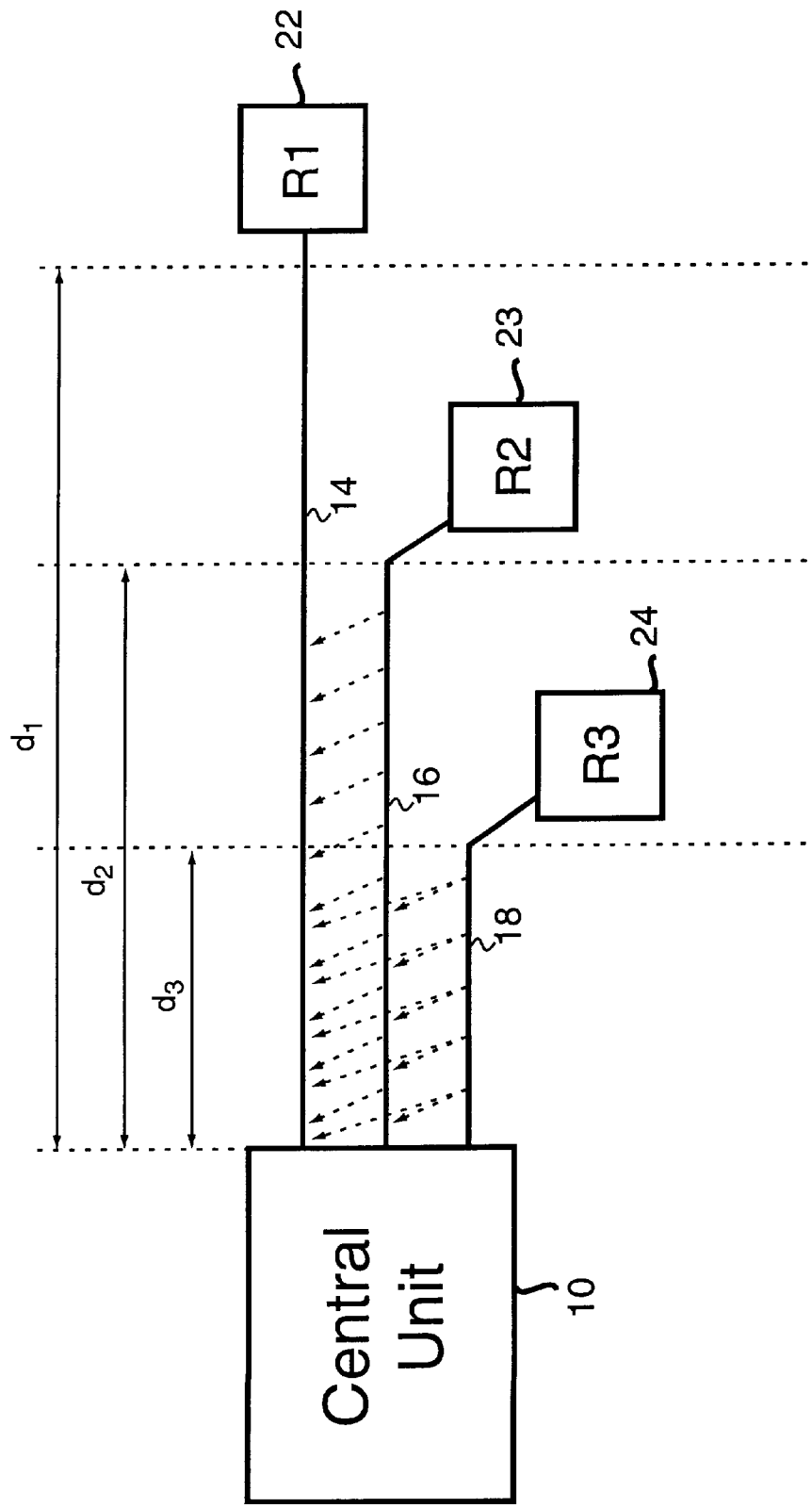
FIG. 1 illustrates a typical subscriber line based telecommunications local loop.
Figure 5:
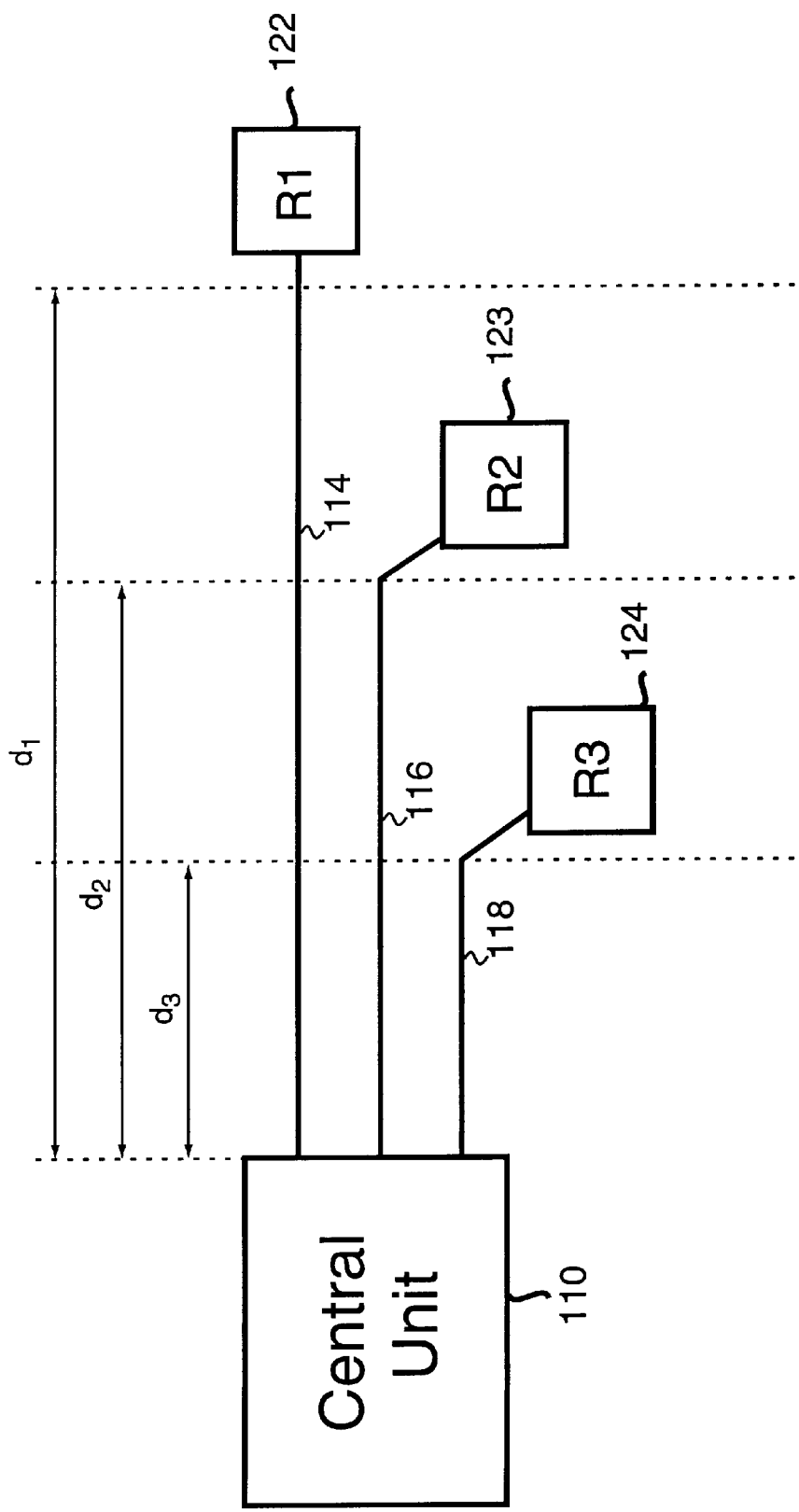
FIG. 5 illustrates a communication system in accordance with an embodiment of the present invention.

FIG. 5 illustrates a communication system with multiple point to point communication subsystems. The communication system includes a central unit 110 that communicates with remote units $R_1$–$R_3$ 122–124. Discrete lines 114, 116 and 118 connect remote units 122–124 to central unit 110. The drop points for remote units 122, 123 and 124 are located at distances d1, d2 and d3, respectively. The central unit may be an ONU, central office or any other type of suitable communication device. The remote units, by way of example, may be telephones, computers, facsimile machines or any other suitable type of communication device. Further, the present invention may be implemented in any suitable type of communication system. By way of example, the present invention may be employed in VDSL, FTTC, ADSL, DMT, DWMT, OFDM and CAP.

In one embodiment, remote unit $R_1$ 122, the furthest remote unit, is allowed to transmit at a maximum power setting over all the available frequencies, $0<f<f_1$. However, the transmissions of remote units $R_2$ 123 and $R_3$ 124 on lines 116 and 118, respectively, are shaped to minimize the FEXT caused by their signals on line 114. FIGS. 6a–6c, 7a–7b and 8 depict the shaping of the outputs of remote units R2 123 and R3 124 compared to the signal of remote unit R1 122 carried on line 114.

FIG. 6a, 6b and 6c illustrate the PSD of a signal transmitted by remote unit $R_1$ on line 114 at distances $d_1$, $d_2$ and $d_3$. The signal attenuates as the distance from remote unit $R_1$ increases. In multi-carrier communication systems the transmitted signal of remote unit $R_1$ is comprised of a number of signals, such as signal 130, segmented over the available frequency range.

FIG. 7a illustrates the PSD of a signal transmitted by remote unit R2 on line 116 at distance $d_2$. The signal is shaped to resemble the PSD of the signal carried on line 114 at distance $d_2$, as seen in FIG. 6b. Since the PSDs of the signals of the two lines are approximately equivalent the amount of cross-talk interference caused by one of the lines on the other line should be approximately equal. As the signal on line 116 travels away from remote unit $R_2$ to distance $d_3$ that signal also attenuates, as shown in FIG. 7b. Generally, the amount of attenuation should be approximately equal to the attenuation of the signal carried on line 114 from distance $d_2$ to $d_3$. Thus, all along the distance from $d_2$ to $d_3$ and to the central unit the magnitudes of the signals on lines 114 and 116 are approximately equal. Accordingly, the amount of cross-talk interference generated by each of the signals on lines 114 and 116 are also approximately equal over their common distances.

FIG. 8 illustrates the PSD of a signal transmitted by remote unit $R_3$ on line 118 at distance $d_3$. In comparison to FIG. 4, the output of remote unit $R_3$ is shaped to resemble the PSDs of the signals carried on lines 114 and 116 at distance $d_3$. The signal on line 118 will thereby generate as much cross-talk interference as the signals carried on lines 114 and 116 rather than generating a significantly larger amount of cross-talk interference between $d_3$ and the central unit.

The shaping of the transmissions of the remote units is determined in part upon the transfer function, H(f), of the channels, or lines. Generally, in one embodiment, the shaping of the transmissions of closer remote units becomes a ratio of the transfer function of the longest line and the transfer function of the particular remote unit.

Figure 9A:
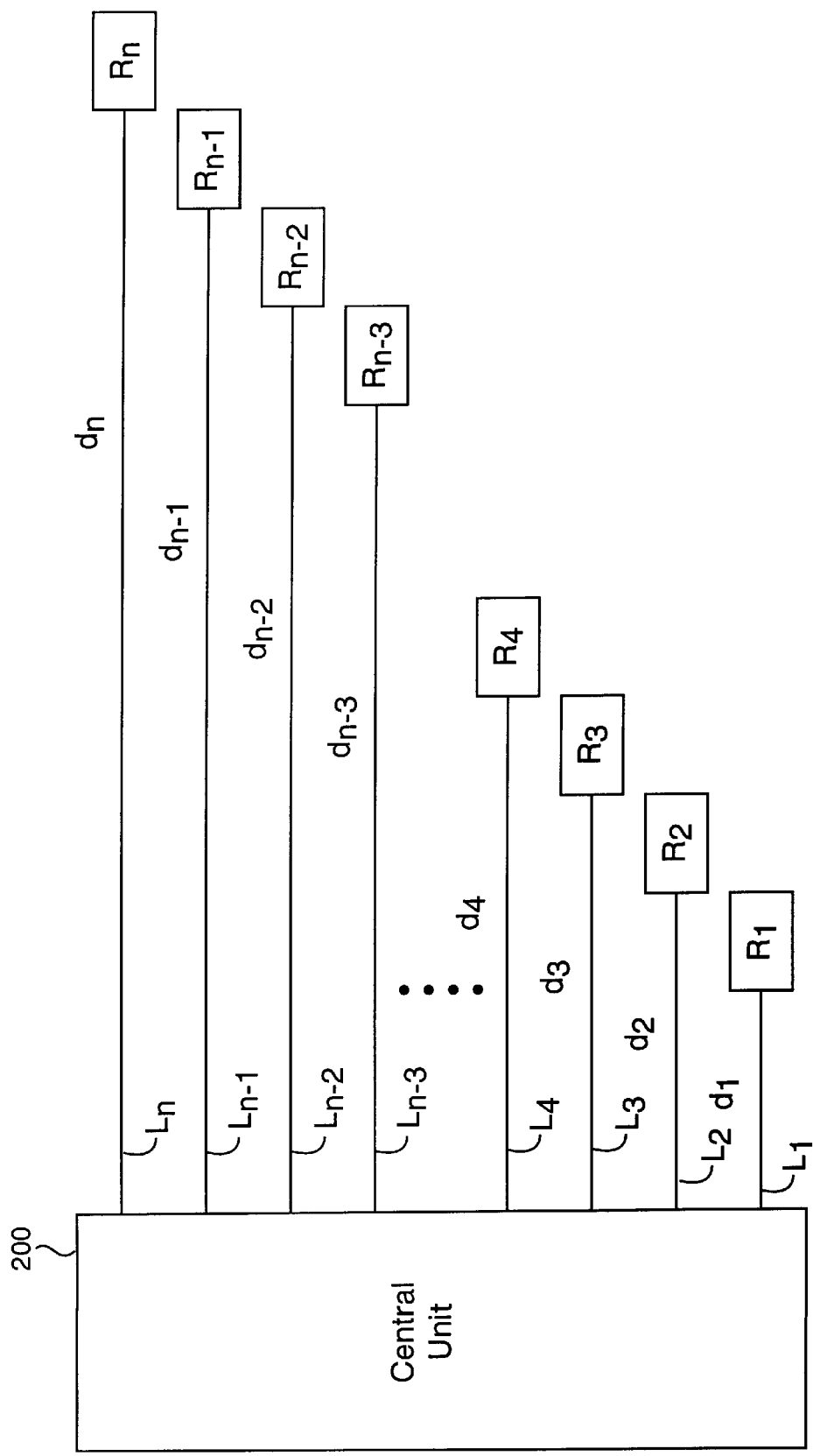
FIG. 9a illustrates a communication system in accordance with an embodiment of the present invention.

FIG. 9a illustrates a exemplary communication system in accordance with an embodiment of the present invention. The communication system includes a central unit 200 and remote units $R_1$–$R_n$. Lines $L_1$–$L_n$ connect the remote units to the central unit. The lengths of the lines vary from $d_1$ to $d_n$, $d_n$ being the longest distance.

One embodiment of the present invention contemplates equalizing the amount of far-end crosstalk (FEXT) received on each line by the central unit. That is, the FEXT injected by other lines should be the same, as seen by the central unit, as if those lines were of the same length as the line under consideration. First, a model of the FEXT seen by the receiver on the line under consideration is needed. Many different types of models may be used, such as the model used by the ANSI TIE1.4 working group. That model is used in the exemplary embodiment, which provides:

$$PSD_{fext}(f) = \left(\frac{n-1}{49}\right)^{0.6} klf^2 PSD_{dist}(f)|H(f)|^2 \qquad \text{Eq. 1}$$

$PSD_{fext}(f)$ is the received power spectral density of the FEXT noise caused by the other lines and injected into the line under consideration. 'n' is the total number of active lines, and n-1 is the number of lines contributing FEXT noise to the line under consideration. 'k' is a constant; 'l' is the length over which FEXT coupling occurs; $PSD_{dist}(f)$ is the transmit PSD of the disturbing lines, and $|H(f)|^2$ is the magnitude of the channel transfer function of the line under consideration. Note that equation I typically assumes that all the disturbing lines are identical to the line under consideration.

In order to equalize the amount of FEXT noise generated by a first line, line (i-1), to a second line (i), the PSD of the line under consideration is computed such that line (i) receives the same amount of FEXT noise line (i) would have received if line (i-1) was of equal length as line (i).

$$PSD_{fext}(f)_{(i-1) \to i} PSD_{fext}(f)_{i \to i} \qquad \text{Eq. 2}$$

The expanded equation is:

$$\left(\frac{1}{49}\right)^{0.6} kd_{i-1}f^2 PSD_{i-1}(f)|H_{i-1}(f)|^2 = \left(\frac{1}{49}\right)^{0.6} kd_i f^2 PSD_i(f)|H_i(f)|^2 \qquad \text{Eq. 3}$$

The 'i' index indicates line (i) is longer than line (i-1). The equation is the simplified version of equation 1 with only one other line considered as a disturbing line, rather than all n-I lines. The constant k, frequency, and coefficients factor out of the equation to provide:

$$PSD_{i-1}(f) = \frac{d_i \cdot |H_i(f)|^2}{d_{i-1} \cdot |H_{i-1}(f)|^2} PSD_i(f) \qquad \text{Eq. 4}$$

Thus the appropriate transmit PSD of the disturbing line, 'i-1', is a function of the transfer functions of the two lines under consideration, the lengths of the lines, and the PSD transmitted on the longer line. Equation 4 provides the relationship between a longer and a shorter line necessary to shape the PSD of the signal carried on the shorter line so that the FEXT received by the central site is approximately the same for both lines.

Starting from line $L_n$, equation 4 may be used recursively to obtain the shaped PSD for all the lines. However, a more general equation based upon the longest line, $L_n$, may be derived.

$$PSD_j(f) = \frac{d_n \cdot |H_n(f)|^2}{d_j \cdot |H_j(f)|^2} PSD_n(f) \qquad \text{Eq. 5}$$

'j' is the index for the PSD of the shorter line at issue. 'n' is the index for the longest line, $L_n$. In one embodiment, $PSD_n$ is the maximum power at all the available frequencies. Of course, any maximum PSD may be used in accordance with the present invention. More specifically, a $PSD_n$ optimized for increased data rates is desirable.

Equation 5 describes that in order to equalize the amount of FEXT noise caused by a shorter line, the PSD of the transmission of the closer remote unit should be reduced by the ratio of distance and magnitude of the longest line (or insertion loss) to the distance and magnitude of the shorter line.

In one embodiment, the insertion loss of the longest line, $L_n$, and its distance, $d_n$, may be obtained during the initialization of remote unit $R_n$. Initialization of remote units is discussed in further detail in U.S. patent application No. 09/111,295, entitled "INITIALIZING COMMUNICATION IN SYSTEMS USING MULTI-CARRIER MODULATION" by Brian Wiese, Krista S. Jacobsen, Nicholas P. Sands and Jacky Chow, filed on Jul. 7, 1998, Attorney Docket No. AMATP026, which is incorporated herein by reference in its entirety.

The insertion loss or transfer function, H(f), and distance, d, of all the remote units may be obtained during initialization of the remote units. In one embodiment, the central unit 200 obtains and records the information. Knowing this information, the central unit 200 computes the appropriate shaping function to be applied to the output of the nearer remote unit. In an alternate embodiment, the remote units may perform the necessary computations necessary to obtain the shaping function. Information about the transfer functions and distances of the remote units may be obtained from the central unit. The remote units, in another embodiment, may also store the necessary information about themselves and only require information from the central unit about other remote units. Thus, the present invention may be implemented in a distributed fashion and is not limited to a central unit that performs all the operations.

In one embodiment, the furthest remote unit is initialized first. The central unit obtains the necessary information about the furthest remote unit and line, i.e., the insertion loss or transfer function, H(f), and the distance d. As other closer remote units come on line the central unit 200 obtains information about those remote units and lines during initialization and computes the necessary shaping information. The shaping information is passed along to the closer remote units during the initialization process so that the output of the closer remote units are shaped as soon as they come on line. This embodiment is useful after power outages, or some other event that requires simultaneous initialization of the remote units.

As discussed in the above-referenced application, the initialization process typically does not require the remote unit to transmit wideband signals to the central unit. Generally, low level wideband signals are sent by the central unit in order to determine the characteristics of the channel, or line, before the remote unit begins to send full bandwidth signals. Such an initialization scheme avoids near-far FEXT during the initialization stage. With proper initialization, the closer remote units will never have sent an unshaped large magnitude full bandwidth signal that would create a significant amount of near-far FEXT noise in adjacent channels, or lines. Of course, some amount of near-far FEXT noise may be accommodated to properly initialize the remote units if need be without creating a significant loss of integrity of the communication system.

Figure 9B:
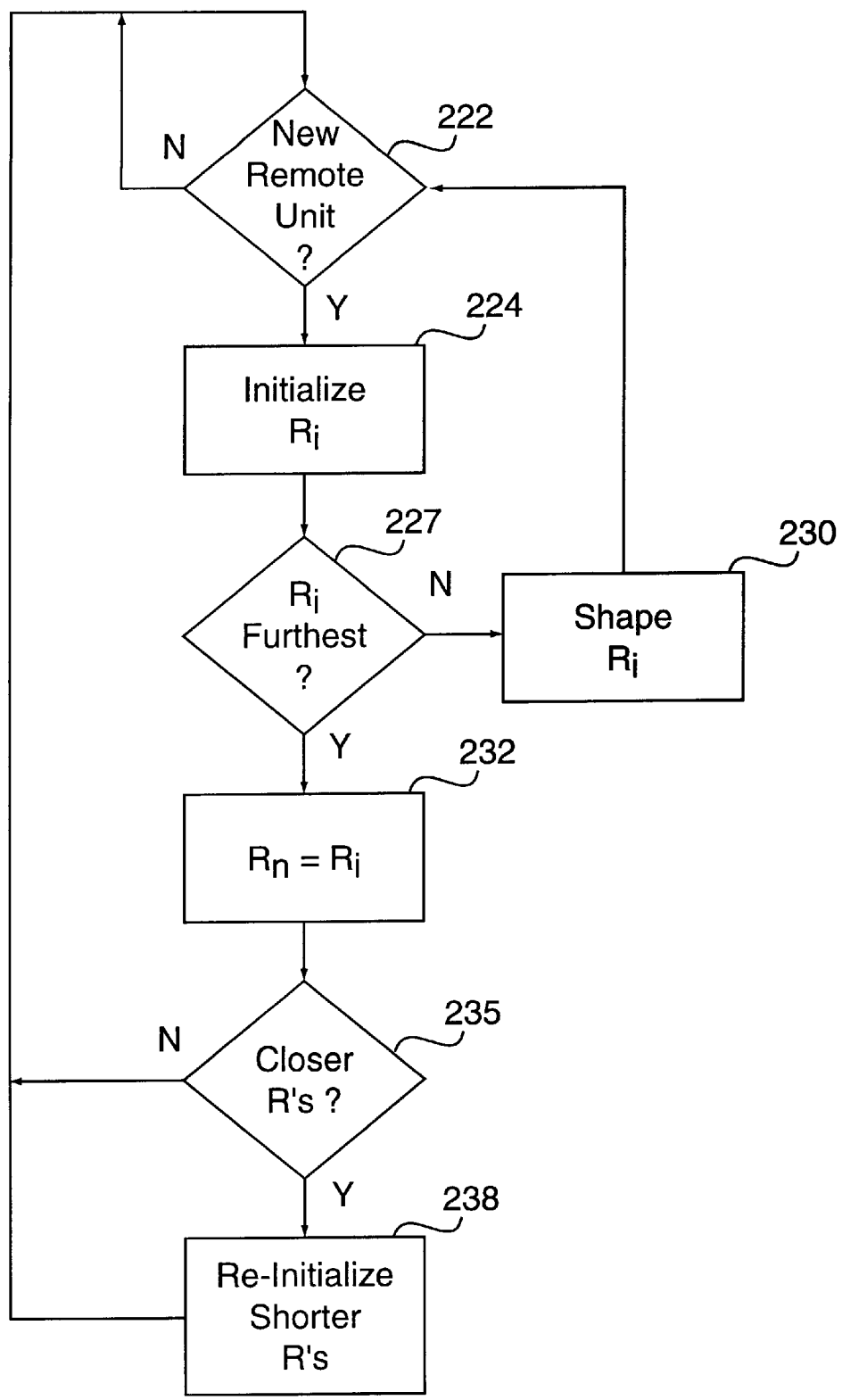
FIG. 9b illustrates a flowchart of the operation of the communication system of FIG. 9a for shaping the outputs of the remote units in accordance with an embodiment of the present invention.
Figure 11A:
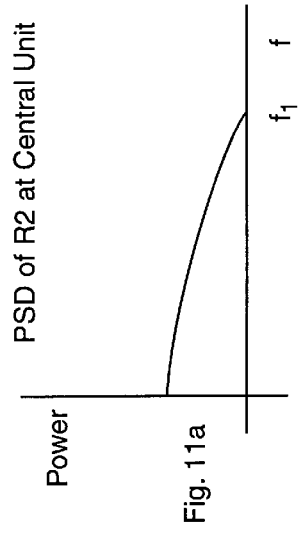
FIG. 11a illustrates the PSD of an unshaped signal transmitted by remote unit $R_2$ of FIG. 5 measured at the central unit.
Figure 12A:
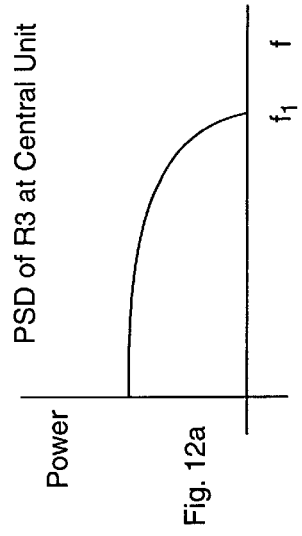
FIG. 12a illustrates the PSD of an unshaped signal transmitted by remote unit $R_3$ of FIG. 5 measured at the central unit.

FIG. 9b illustrates a flowchart 220 of the operation of the central unit of FIG. 9a for shaping the outputs of the remote units in accordance with an embodiment of the present invention. Flowchart 220 begins at block 222 where central unit 200 waits for a remote unit to come on line. Once a remote unit comes on line operations proceed to block 224 where the central unit 200 initializes the new remote unit, $R_1$. During the operations of block 224 the central unit determines the transfer function, $H_i(f)$, and the distance, $d_i$, of the line connecting remote unit $R_i$ with the central unit. The determination of $H_i(f)$ and $d_i$ may be performed in any suitable manner. Timing and training signals, as known in the art, may be used to determine the values of $H_i(f)$ and $d_i$.

After initialization, the central unit determines whether $R_i$ is the furthest remote unit in block 227 by comparing the distances of the other currently operating remote units. If $R_i$ is not the furthest remote unit, the central unit 200 proceeds to block 230 and shapes the output of $R_i$. The central unit provides $R_i$ with the appropriate shaping factor of the transmit PSD of $R_i$ to reduce the FEXT line (i) produces in other, longer lines.

In one embodiment, the shaping factor is a function of the transfer function of $R_i$, $H_i(f)$, the distance between $R_i$ and the central unit, $d_i$, the transfer function of the furthest remote unit, $H_n(f)$, the distance between the furthest remote unit and the central unit, $d_n$, and the transmit PSD of the output of the furthest remote unit, $PSD_n(f)$. This relationship is described above in reference to equation 5. In an alternative embodiment the transfer function, distance and PSD of the next furthest remote unit may be used, as described in relation to equation 4. In yet another embodiment, the shaping factor is a function of the transfer functions of $R_i$ and the furthest remote unit and $PSD_n(f)$, as described in further detail below. After $R_i$ is completely initialized, operations return to block 222.

If $R_i$ is the furthest remote unit, operations proceed from block 227 to block 232. In block 232 remote unit $R_i$ is designated as the furthest remote unit, $R_n$. The output of $R_n$, $PSD_n(f)$, is set at the maximum power output over the available frequencies. In another embodiment, the output of $R_n$ may also be shaped for optimal data rates rather than simply transmitting at the maximum power. Any other suitable types of spectral shaping may be utilized in accordance with the present invention. By way of example, the furthest remote unit, $R_n$, may only use a portion of the available frequencies rather than all the available frequencies, as described further below.

Proceeding to block 235, the central unit determines if any previously initialized remote units are currently operating. Those remote units are closer than the new remote unit since it has been determined that it is the furthest remote unit in block 227. If so, the central unit in block 238 attempts to reinitialize the previously initialized remote units using the information about the new furthest remote unit, $R_n$, i.e., $H_n(f)$ and dn. In another embodiment, the previously initialized remote units are not re-initialized in order to avoid service interruption. In an alternative embodiment, re-initialization is performed during periods of inactivity of the closer remote units. Once the closer remote units have been retrained, if at all, operations proceed back to block 222. If there are no closer remote units operations proceed from block 235 back to block 222.

In another embodiment, the central unit may first determine all the lengths and line characteristics of all the remote units during the physical establishment of the communication system. Typically, once a communication system is physically constructed the distances between the remote units and the central site do not change substantially. Generally, the characteristics of the channels, or lines, also do not change significantly over time. The central unit may gather all the necessary information about the transfer functions and lengths of the channels at this point and store them.

Once a remote unit comes on line the central unit may determine which of the remote units it is. By way of example, referring to FIG. 9a, if remote unit $R_4$ is the first remote unit to come on line the central unit can determine during initialization that $R_4$ is the fourth closest remote unit. Knowing the position of $R_4$, and already possessing the transfer function and distance of the furthest remote unit, $H_n(f)$ and $d_n$, the central unit may shape the output of $R_4$ in anticipation of $R_n$ eventually coming on line. Thus, when remote unit $R_n$ does come on line $R_4$ need not be re-initialized in order to reduce the near-far FEXT generated by $L_4$ on $L_n$. Thus, the shaping of the outputs of the remote units may be predetermined at the establishment of the communication system. Of course, as new remote units are installed and changes in the conditions of the channels occur, the set of stored transfer functions and line lengths may be updated.

The amount of information passed from the central unit to the remote units during the shaping process may vary. In one embodiment, the central unit may obtain and store all the information about all the remote units and inform each remote unit how to shape its output. In another embodiment, the remote units may measure some of the required information. For example, each remote unit may measure the transfer function and distance of its own line. The central unit may then inform each remote unit with data about the furthest remote unit only. The remote units may then be able to calculate the desired shape of its output. The central unit may also simply inform the remote units the desired PSDs it would like to receive and allow the remote units to determine the necessary shaping. Other alternative permutations of information gathering and shaping may be performed in accordance with the present invention.

In another embodiment of the present invention, the shaping of the outputs of the closer remote units is determined by the PSD of the signals received at the central unit. Rather than attempting to completely equalize the FEXT generated by the signals carried on the lines and received by the central unit, the transmitted signals may be shaped such that their PSDs appear nearly identical at the central unit. Thus, a PSD plot of all the signals measured at the central unit should look very similar, if not nearly identical. While this may also be the result of the previously described embodiments, there is a subtle difference.

The relationship for determining the PSD of the signals based upon the PSD of the signals at the central unit may be represented as:

$$PSD_i(f) = \frac{|H_n(f)|^2}{|H_i(f)|^2} PSD_n(f) \qquad \text{Eq. 6}$$

'n' is the index for the longest line and 'i' is the index for the line under consideration. Note that the distances between the remote units and the central unit no longer factor in the shaping of the PSD of the signals. Setting the PSDs of the signals equal to each other at the central unit eliminates the need to compute the distances of the remote units because the particular embodiment does not necessarily equalize the received FEXT on lines. Instead, the effects of the near-far FEXT generated by the lines are mitigated solely by PSD shaping rather than attempting to equalize near-far FEXT at the receivers.

Figure 10A:
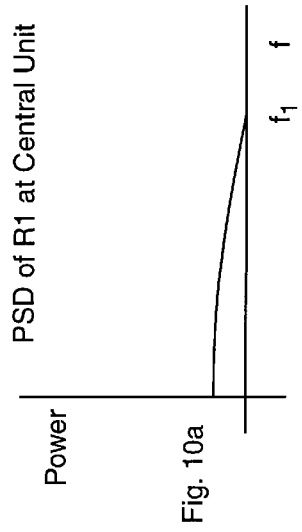
FIG. 10a illustrates the PSD of an unshaped signal transmitted by remote unit $R_1$ of FIG. 5 measured at the central unit.
Figure 10B:
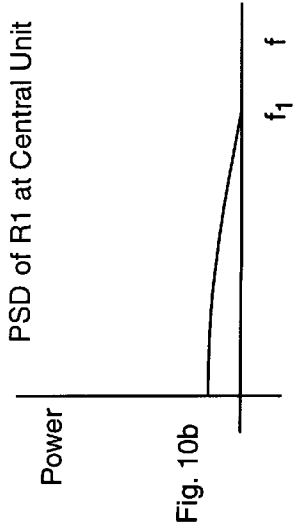
FIG. 10b illustrates the PSD of an unshaped signal transmitted by remote unit $R_1$ of FIG. 5 measured at the central unit.
Figure 11B:
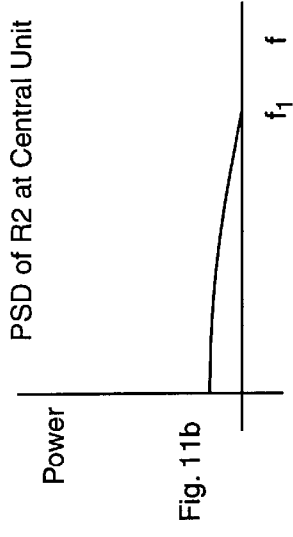
FIG. 11b illustrates the PSD of a shaped signal transmitted by remote unit $R_2$ of FIG. 5 measured at the central unit in accordance with an embodiment of the present invention.
Figure 12B:
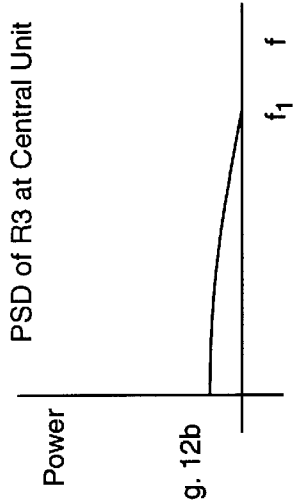
FIG. 12b illustrates the PSD of a shaped signal transmitted by remote unit $R_3$ of FIG. 5 measured at the central unit in accordance with an embodiment of the present invention.

Referring back to the embodiment of the present invention depicted in FIG. 5, FIGS. 10a, 11a and 12a illustrate the PSDs of the signals generated by remote units $R_1$, $R_2$ and $R_3$, respectively, as measured at the central unit 110 without any shaping. Using the relationship defined in equation 6, the outputs of remote units $R_1$, $R_2$ and $R_3$ are shaped to produce signals with PSDs as depicted in FIGS. 10b, 11b and 12b, as measured at the central unit. All three remote units appear the same in the perspective of the central unit, and would typically be able to handle approximately the same amount of data without detrimentally harming the operations of the other remote units.

In another embodiment, the shaping of the outputs of the remote units may be performed over segments of the available bandwidth. The PSD shaping or FEXT equalization shaping methods described may be used in addition to any other suitable type of shaping. FIGS. 13a–13c, 14a–14b and 15 illustrate the PSDs of signals generated by the remote units of FIG. 5 at various distances.

FIGS. 13a, 13b and 13c illustrate the PSDs of a signal generated by remote unit $R_1$ 122 of FIG. 5 at distances $d_1$, $d_2$ and $d_3$, respectively. Instead of transmitting over the entire available frequencies, the remote unit $R_1$ may transmit only up to frequency $f_1$. There are a number of reasons to segment the available frequencies. One predominant reason is that the frequency range of a channel may decrease as the line length increases. Thus, remote units on longer lines may only be able to use a smaller frequency band than remote units on shorter lines.

FIGS. 14a and 14b illustrate the PSDs of the signals transmitted by remote unit $R_2$ 123 at distances $d_2$ and $d_3$, respectively. Referring to FIG. 14a, $R_2$ transmits over the frequencies between 0 and $f_2$. However, the PSD of the signal transmitted by $R_2$ is shaped only in the frequencies from 0 to $f_1$ since the next furthest remote unit, $R_1$, is only transmitting in that frequency range. Thus, $R_2$ need not worry about FEXT noise coupling into line 114 at frequencies $f_1$ to $f_2$. The shaping function of remote unit $R_2$ may be written as:

$$PSD_k(f) = \begin{cases} \frac{d_n \cdot |H_n(f)|^2}{d_k \cdot |H_k(f)|^2} PSD_n(f), & 0 < f \leq f_1 \\ P_{max}, & f_1 < f \leq f_2 \end{cases} \quad \text{Eq. 7}$$

where 'n' is the index for the furthest remote unit and 'k' is the index for the remote unit at issue. $P_{max}$ is the maximum power, but other suitably shaped power levels may be defined as the transmit power at frequencies $f_1$ to $f_2$.

Referring to FIGS. 14b and 13c, the PSDs of the signals carried by lines 114 and 116 are similar at distance d3 up to frequency f1. At the frequencies f1 to f2 only line 116 carries any signal—the output of remote unit R2.

FIG. 15 illustrates the PSD of a signal transmitted by remote unit R3 124 at distance d3 on line 118. Notice that R3 transmits shaped transmissions up to f2 and transmits at full power at the frequencies f2 to f3. Further, the shaping of the transmission over the frequencies 0 to f1 differs from the shaping of the transmission over f1 to f2. This is due to the fact that over the frequency range 0 to f1 the furthest remote unit is R1 at distance d1. However, at frequencies f1 to f2 remote unit R2 at distance d2 is the furthest remote unit. The shaping of the transmissions of R3 may take advantage of the differential in the furthest remote unit over the different frequency ranges in order to optimize throughput. The shaping of the transmissions of R3 may be written as:

$$PSD_l(f) = \begin{cases} \frac{d_n \cdot |H_n(f)|^2}{d_l \cdot |H_l(f)|^2} PSD_n(f), & 0 < f \leq f_1 \\ \frac{d_k \cdot |H_k(f)|^2}{d_l \cdot |H_l(f)|^2} PSD_k(f), & f_1 < f \leq f_2 \\ P_{max}, & f_2 < f \leq f_3 \end{cases} \quad \text{Eq. 8}$$

'n' is the index of the furthest remote unit over the frequency range 0 to f1; 'k' is the index of the furthest remote unit over the frequency range $f_1$ to f2; and 'l' is the index of the remote unit that is being shaped. In one embodiment, it is assumed that the furthest remote unit at a given range is transmitting at maximum power, or any other predetermined power magnitudes to maximize data rates.

The present invention may also be applied to single-carrier and carrier-less communication systems, such as QAM and CAP. Rather than shaping signals that are segmented over the available range of frequencies, as depicted in FIG. 6a, shaping is performed on a single signal that spans the entire frequency range.

The present invention, therefore, reduces near-far FEXT interference between different communication channels that utilize the same frequencies. By shaping the transmissions of the remote units, possibly depending upon their distances from a central unit, near-far FEXT noise is significantly reduced. Shaping may be performed during the initialization stages of communications so no bandwidth is required during actual communication. The present invention may be applied to wired, multi-carrier, single carrier and carrier-less communication systems.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method of shaping transmissions between two or more remote units and a central unit, each of the remote units coupled to the central unit through a channel, each remote unit sending a transmission to the central unit over the channel, the method comprising:

measuring a channel of a first remote unit of the remote units; and adjusting the transmission of a second remote unit of the remote units based upon the measurement of the channel of the first remote unit;

wherein the adjusting of the transmission of the second remote unit reduces the cross-talk between the channel of the second remote unit and the channel of the first remote unit.

2. A method as recited in claim 1, wherein each of the channels coupling the remote units to the central unit are located relative to each other such that the transmission of each remote unit causes cross-talk between the channel coupled to the transmitting remote unit and the other channels.

3. A method for reducing cross-talk in a communication system, the communication system including a central unit, two or more remote units, each of the remote units communicatively coupled to the central unit through a channel, wherein the channels are located relative to each other such that a transmission to or from a one of the remote units that passes through a one of the channels creates cross-talk interference in one or more of the other channels, the method comprising:

measuring a first channel between the central unit and a first remote unit and providing a transfer function of the first channel; and adjusting a transmission of a second remote unit passing through a second channel communicatively coupling a second remote unit with the central unit, the transmission having a spectral shape, the adjustment shaping the spectral shape of the transmission of the second remote unit passing through the second channel such that cross-talk interference in the first channel is reduced.

4. A method as recited in claim 3 further comprising:
measuring the second channel and providing a transfer function of the second channel.

5. A method as recited in claim 3, wherein the adjustment of the transmission of the second remote unit passing through the second channel is based in part upon the transfer function of the first channel.

6. A method as recited in claim 4, wherein the adjustment of the transmission of the second remote unit passing through the second channel is based in part upon the transfer function of the second channel.

7. A method as recited in claim 4, wherein the adjustment of the transmission of the second remote unit passing through the second channel is based in part upon the transfer functions of the first and second channels.

8. A method as recited in claim 3, wherein the measuring of the first channel further provides a first length of the first channel, such that the adjustment of the transmission of the second remote unit passing through the second channel is based in part upon the first length.

9. A method as recited in claim 4, wherein the measuring of the second channel further provides a second length of the second channel, such that the adjustment of the transmission of the second remote unit passing through the second channel is based in part upon the second length.

10. A method as recited in claim 3, wherein the transmission of the second remote unit passing through the second channel includes a power spectral density, wherein in adjusting the transmission of the second remote unit passing through the second channel the power spectral density of the transmission passing through the second channel is adjusted.

11. A method as recited in claim 3, wherein the communication system is a multi-carrier communication system.

12. A method as recited in claim 3, wherein each of the channels is chosen from a group consisting of coaxial cable, twisted pair wire and flat pair wire.

13. A method for reducing cross-talk in a communication system, the communication system including a central unit, two or more remote units, each of the remote units communicatively coupled to the central unit through a channel, wherein the channels are located relative to each other such that a transmission to or from a one of the remote units that passes through a one of the channels creates cross-talk interference in one or more of the other channels, the method comprising:
measuring a first channel between the central unit and a first remote unit and providing a transfer function of the first channel; and,
adjusting a transmission of a second remote unit passing through a second channel communicatively coupling a second remote unit with the central unit, the transmission having a spectral shape, the adjustment shaping the spectral shape of the transmission of the second remote unit passing through the second channel such that cross-talk interference in the first channel is reduced;
wherein the transmission passing through the second channel is a multi-carrier transmission including a plurality of carriers, each carrier centered at a frequency over a span of frequencies.

14. A method as recited in claim 13, wherein the adjusting of the transmission passing through the second channel is performed over the entire span of frequencies.

15. A method as recited in claim 13, wherein the adjusting of the transmission passing through the second channel is performed on a subset of the plurality of carriers over a corresponding sub-range of frequencies of the range of frequencies.

16. A communication system comprising:
a central unit; and
two or more remote units, each of the remote units capable of receiving and sending a transmission to the central unit through a channel, each channel communicatively coupling the remote units to the central unit, and each channel having a characteristic;
wherein an output transmission of a first remote unit is based in part upon the characteristic of a channel of a second remote unit.

17. A communication system as recited in claim 16, wherein the characteristic of the channel of the second remote unit is a transfer function of the channel of the second remote unit.

18. A communication system as recited in claim 16, wherein the characteristic of the channel of the second remote unit is a distance of the channel of the second remote unit.

19. A communication system as recited in claim 16, wherein the second remote unit is located further from the central unit than the first remote unit.

20. A communication system as recited in claim 16, wherein the transmission of the first remote unit is shaped at least in part by the characteristic of the channel of the second remote unit, and a channel of the first remote unit is disposed sufficiently approximate to the channel of the second remote unit such that transmissions carried on either channel causes cross-talk interference on the other channel, the shaping of the transmission of the first remote unit reducing the cross-talk caused by the transmission carried on the channel of the first remote unit on the channel of the second remote unit.

21. A communication system comprising:
a central unit; and
two or more remote units, each of the remote units capable of receiving and sending a transmission to the central unit through a channel, each channel communicatively coupling the remote units to the central unit, and each channel having a characteristic;
wherein a transmission of a first remote unit is based in part upon the characteristic of a channel of a second remote unit;
wherein the transmission of the first remote unit is shaped at least in part by the characteristic of the channel of the second remote unit, and a channel of the first remote unit is located relative to the channel of the second remote unit such that transmissions carried on either channel causes cross-talk interference on the other channel, the shaping of the transmission of the first remote unit reducing the cross-talk caused by the transmission carried on the channel of the first remote unit on the channel of the second remote unit; and,
wherein the transmission of the first remote unit is shaped such that the transmission carried on the channel of the first remote unit is approximately identical to a transmission of the second remote unit carried on the channel of the second remote unit along the extent of the channel of the first remote unit that is common with the extent of the channel of the second remote unit.

22. A communication system as recited in claim 20, wherein the transmission of the first remote unit is shaped such that the transmission carried on the channel of the first remote unit is approximately spectrally identical to a transmission of the second remote unit carried on the channel of the second remote unit as measured at the central unit.

23. A communication system comprising:
a central unit; and two or more remote units, each of the remote units capable of receiving and sending a transmission to the central unit through a channel, each channel communicatively coupling the remote units to the central unit, and each channel having a characteristic;

wherein a transmission of a first remote unit is based in part upon the characteristic of a channel of a second remote unit;

wherein the transmission of the first remote unit is shaped at least in part by the characteristic of the channel of the second remote unit, and a channel of the first remote unit is located relative to the channel of the second remote unit such that transmissions carried on either channel causes cross-talk interference on the other channel, the shaping of the transmission of the first remote unit reducing the cross-talk caused by the transmission carried on the channel of the first remote unit on the channel of the second remote unit; and, wherein the transmission of the first remote unit is a multi-carrier transmission including a plurality of carriers, each carrier centered at a frequency over a span of frequencies.

24. A communication system as recited in claim 23, wherein the shaping of the multi-carrier transmission is performed over the entire span of frequencies.

25. A communication system as recited in claim 23, wherein the shaping of the multi-carrier transmission is performed on a subset of the plurality of carriers over a corresponding sub-range of frequencies of the range of frequencies.

26. A transceiver for use in a communication system, wherein the transceiver is one of two or more transceivers in the communication system, the communication system further comprising a central unit, each of the transceivers communicatively coupled to the central unit through a channel, each channel having a characteristic, wherein the transceiver transmits a signal to the central unit across a channel, the signal being spectrally shaped such that interference generated on the other channels by the signal, while transmitted across the channel, is reduced.

27. A transceiver as recited in claim 26, wherein the shaping of the signal is based in part upon the characteristic of one of the other channels.

28. A transceiver as recited in claim 27, wherein the characteristic is a length of the one of the other channels.

29. A transceiver as recited in claim 27, wherein the characteristic is a transfer function of the one of the other channels.

30. A transceiver for use in a communication system, wherein the transceiver is one of two or more transceivers in the communication system, the communication system further comprising a central unit, each of the remote units communicatively coupled to the central unit through a channel, each channel having a characteristic, wherein the transceiver transmits a signal to the central unit across a channel the signal being spectrally shaped such that interference generated by the signal while transmitted across the channel on the other channels is reduced; and, wherein the signal being transmitted by the central unit across the channel is a multi-carrier signal including a plurality of carriers, each carrier centered at a frequency over a span of frequencies.

31. A transceiver as recited in claim 30, wherein the shaping of the multi-carrier signal is performed on a subset of the plurality of carriers over a corresponding sub-range of frequencies of the range of frequencies.

32. A central unit for use in a communication system, the communication system including two or more remote units, each of the remote units communicatively coupled to the central unit by a channel, the remote units sending and receiving transmissions to and from the central unit, wherein the central unit measures a characteristic of a first channel of a first remote unit, and adjusts a transmission of a second remote unit carried on a second channel based upon the characteristic of the first channel, the adjusting of the transmission of the second remote unit reducing cross-talk interference generated by the transmission carried on the second channel and received by the first channel.

33. A central unit as recited in claim 32, wherein the central unit adjusts the transmission of the second remote unit based in part on the characteristic of the first channel, the characteristic of the first channel being one or more of the characteristics chosen from the group consisting of a length of the first channel and a transfer function of the first channel.

34. A central unit as recited in claim 32, wherein the central unit measures a characteristic of the second channel and adjusts the transmission of the second channel based in part on the characteristic of the second channel, the characteristic of the second channel being one or more of the characteristics chosen from the group consisting of a length of the second channel and a transfer function of the second channel.

35. A central unit as recited in claim 32, wherein the central unit adjusts the transmission of the second remote unit by providing the second remote unit with the measurement of the characteristic of the first channel.

36. A central unit as recited in claim 32, wherein the central unit adjusts the transmission of the second remote unit by providing the second remote unit with a desired power spectral density such that the second remote unit transmits at a transmit power spectral density such that the central unit receives the desired power spectral density.

37. A central unit for use in a communication system, the communication system including two or more remote units, each of the remote units communicatively coupled to the central unit by a channel, the remote units sending and receiving transmissions to and from the central unit, wherein the central unit measures a characteristic of a first channel of a first remote unit, and adjusts a transmission of a second remote unit carried on a second channel based upon the characteristic of the first channel, the adjusting of the transmission of the second remote unit reducing cross-talk interference generated by the transmission carried on the second channel and received by the first channel; and, wherein the transmission of the second remote unit is a multi-carrier signal including a plurality of carriers, each carrier centered at a frequency over a span of frequencies.

38. A central unit for use in a communication system, the communication system including two or more remote units, each of the remote units communicatively coupled to the central unit by a channel, the remote units sending and receiving transmissions to and from the central unit, wherein the central unit measures a characteristic of a first channel of a first remote unit, and adjusts a transmission of a second remote unit carried on a second channel based upon the characteristic of the first channel, the adjusting of the transmission of the second remote unit reducing cross-talk interference generated by the transmission carried on the second channel and received by the first channel;

wherein the central unit adjusts the transmission of the second remote unit by providing the second remote unit with a desired power spectral density such that the second remote unit transmits at a transmit power spectral density such that the central unit receives the desired power spectral density; and, wherein the adjusting of the multi-carrier transmission is performed on a subset of the plurality of carriers over a corresponding sub-range of frequencies of the range of frequencies.

39. A method of shaping transmissions between a plurality of remote units and a central unit, each of the remote units coupled to the central unit through a channel, each remote unit sending a transmission to the central unit, each transmission having a spectrum, the method comprising:

adjusting the transmission of the remote units such that the transmissions of all of the remote units have approximately identical spectrums as received by the central unit;

wherein the adjusting of the transmissions of the remote units reduces the cross-talk between the channels of the remote units.

40. A method as recited in claim 39, wherein in adjusting the transmissions of the remote units, the central unit provides the remote units with a desired received spectrum during initialization of the remote units.

41. A method as recited in claim 40, further comprising:

each of the remote units measuring a corresponding channel coupling each of the remote units to the central unit; and each of the remote units adjusting its transmission based upon the measurement of the corresponding channel and the desired received spectrum provided by the central unit.

* * * * *